United States Patent [19]
Shaw

[11] Patent Number: 6,141,376
[45] Date of Patent: Oct. 31, 2000

[54] SINGLE CHIP COMMUNICATION DEVICE THAT IMPLEMENTS MULTIPLE SIMULTANEOUS COMMUNICATION CHANNELS

[75] Inventor: Carl Shaw, Highland Beach, Fla.

[73] Assignee: LSI Logic Corporation, Milpitas, Calif.

[21] Appl. No.: 08/831,405

[22] Filed: Apr. 1, 1997

[51] Int. Cl.[7] .................................................. H04B 1/38
[52] U.S. Cl. ...................... 375/222; 370/464; 370/463; 709/250
[58] Field of Search .................................... 375/222, 257; 395/200.8; 709/250; 370/463, 319, 464

[56] References Cited

U.S. PATENT DOCUMENTS

| | | | |
|---|---|---|---|
| 5,537,436 | 7/1996 | Bottoms et al. | 375/222 |
| 5,537,441 | 7/1996 | Bremer et al. | 375/261 |
| 5,712,872 | 1/1998 | Hawkins et al. | 375/222 |
| 6,023,473 | 2/2000 | Reine et al. | 370/463 |

OTHER PUBLICATIONS

Kieran Taylor; Analog and ISDN Access Is in the Cards, Nov. 1995.

*Primary Examiner*—Kenneth R. Coulter

[57] ABSTRACT

A single chip communications controller responsive to control program commands, implements at least three major communication function standards simultaneously by using a superscalar processor coupled to a multi-functional communication interface unit, and a supportive memory system via a common communication bus.

20 Claims, 4 Drawing Sheets

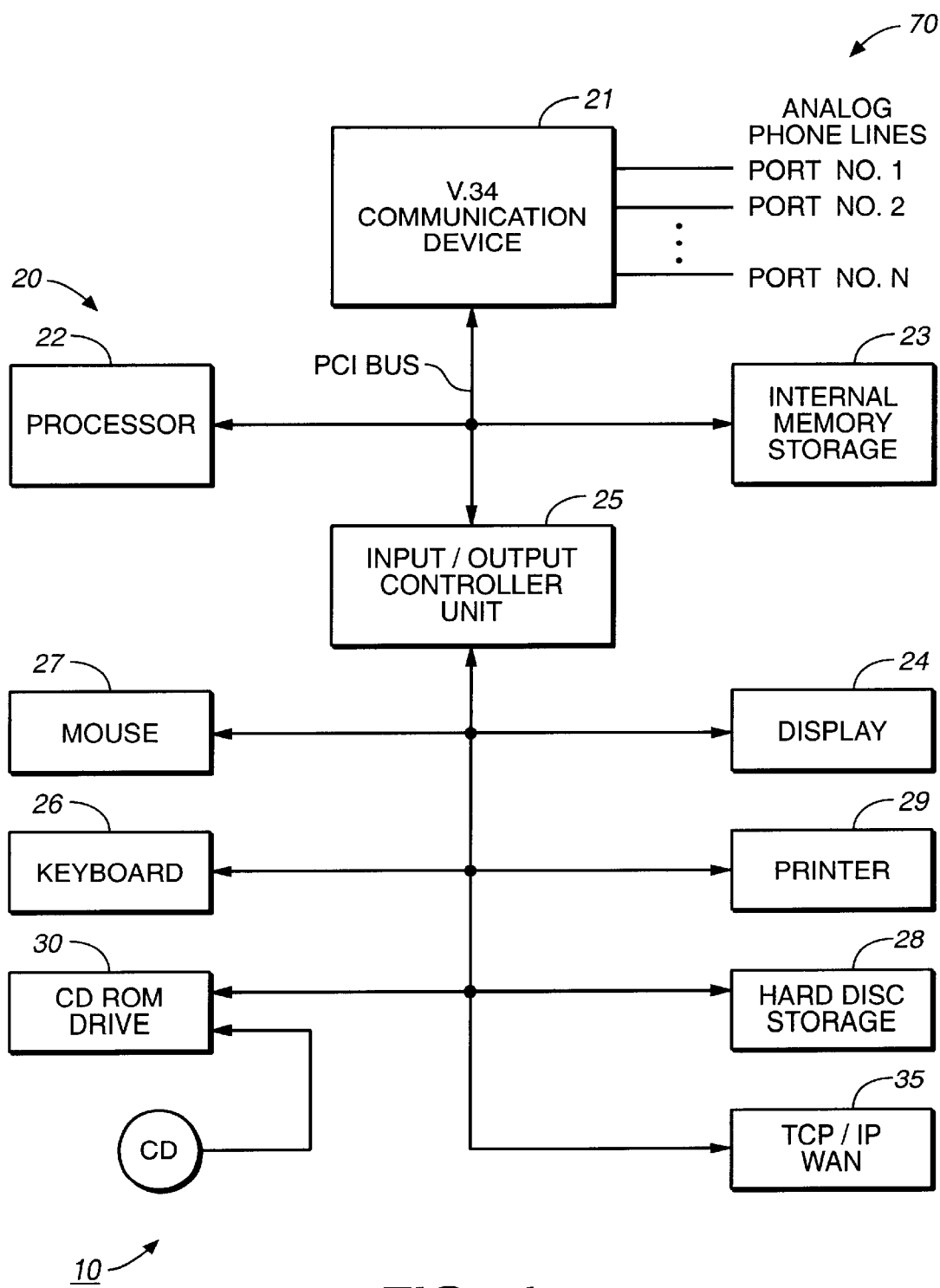
FIG._1

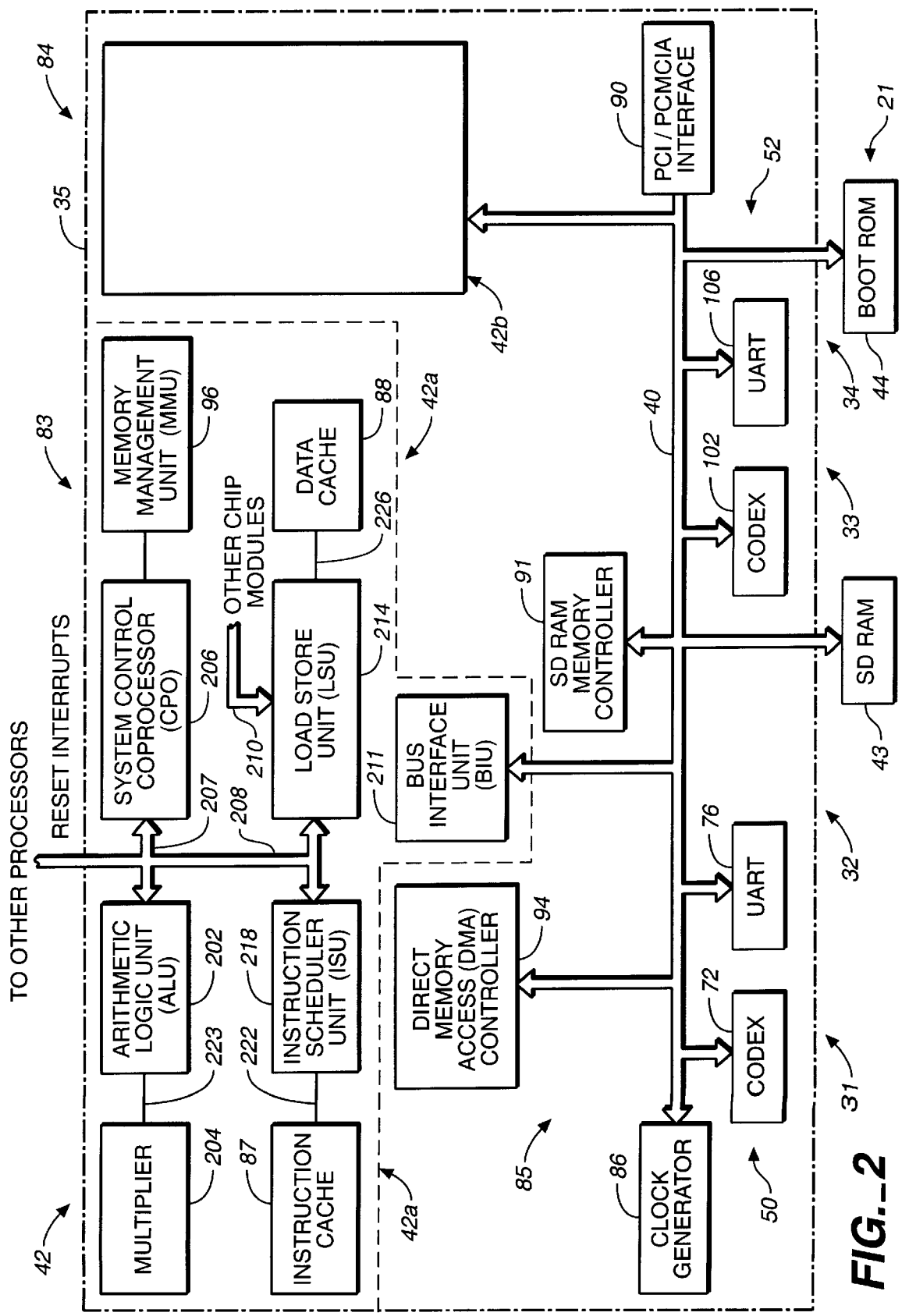
FIG._2

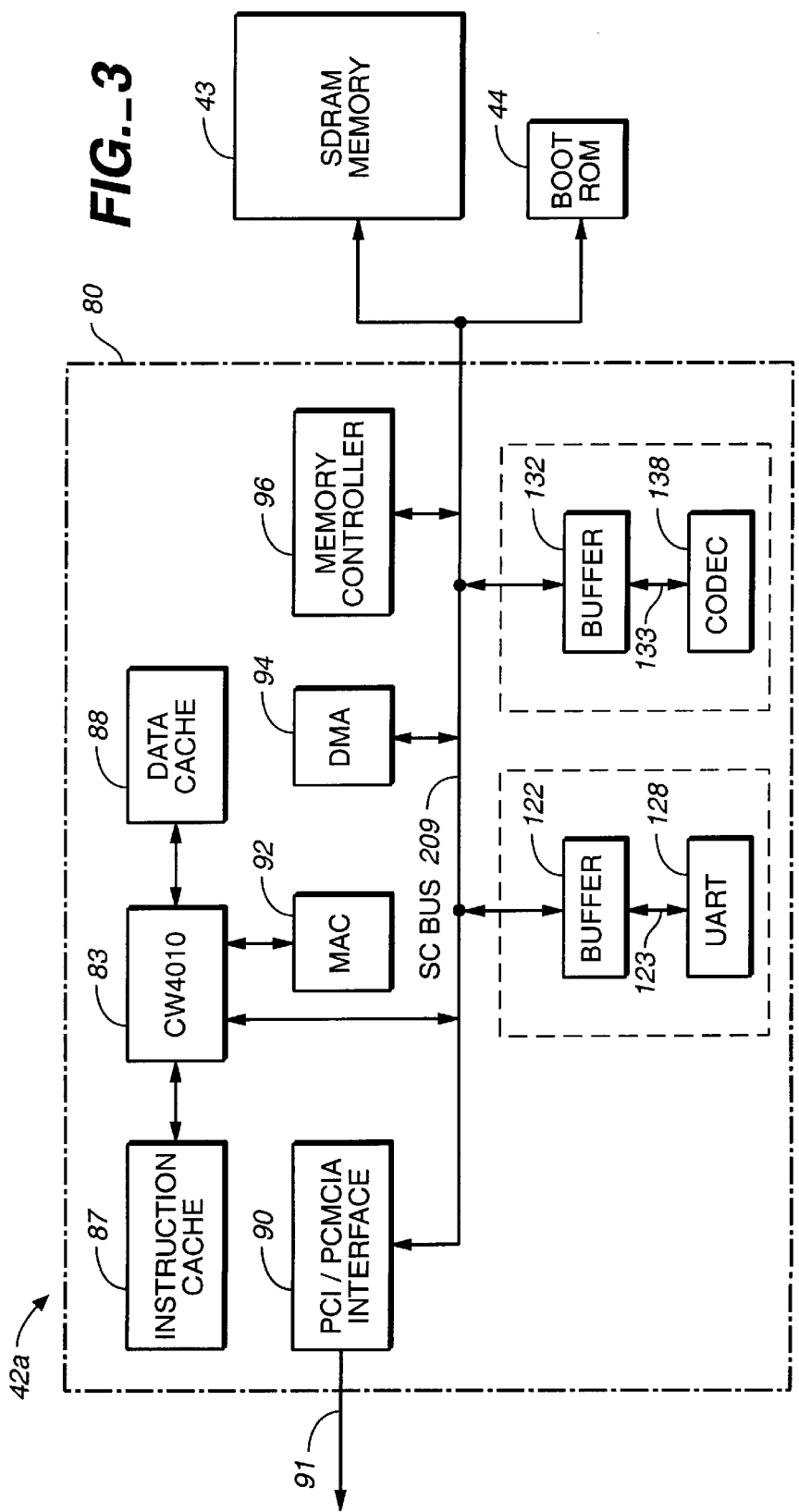
FIG._3
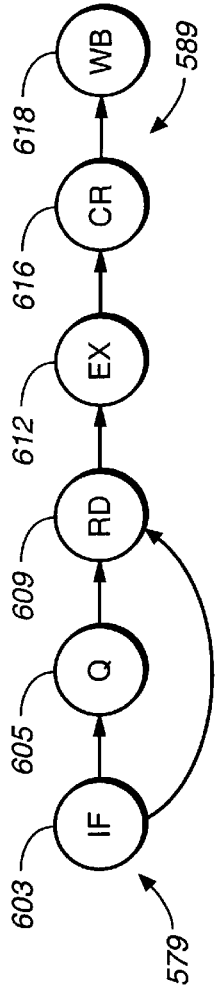
FIG._4

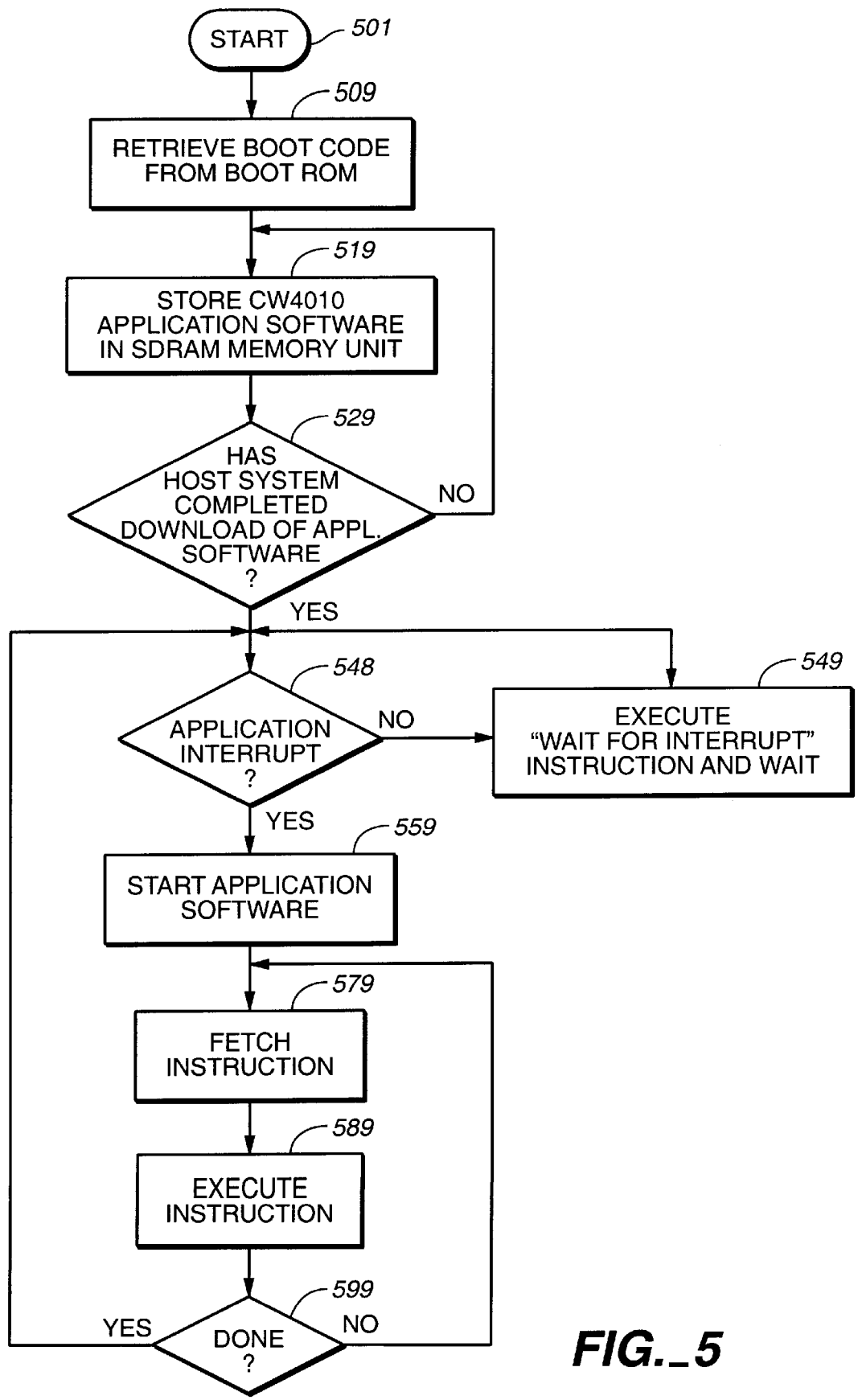
FIG._5

SINGLE CHIP COMMUNICATION DEVICE THAT IMPLEMENTS MULTIPLE SIMULTANEOUS COMMUNICATION CHANNELS

BACKGROUND OF THE INVENTION

1. Field of the Invention

The present invention generally relates to the art of electronic data transmissions, and more specifically to an Internet provider system for handling a plurality of V.34 communication channels simultaneously utilizing a single chip multi-port V. 34 communication device.

2. Description of Related Art

The present state of internet communications has advanced substantially from that available in prior years. New and sophisticated browsers coupled with higher data transmission rates have caused an explosion in the field of internet communications. Such an industry explosion has caused point of present providers to rapidly expand their user access capacity. With the present V.34 technology, this expansion has proven costly. Communication service providers who provide dial-up connections to data services, bulletin boards or the Internet, typically have banks of such modems. Each such modem, handling but a single communication channel and requiring a separate enclosed power supply and other related hardware. Thus, the cost of the multiplicity of modems, the space commanded, the power drain and the heat generated can be significant.

Therefore, it would be highly desirable to have a new and improved V.34 communication device that provides multiple simultaneous V.34 communication channels with a single chip set for helping to reduce space and power requirements. Such a V.34 communication device should be convenient to install and relatively inexpensive to manufacture.

SUMMARY OF THE INVENTION

Therefore, the principal object of the present invention is to provide a new and improved V.34 communication device that provides multiple simultaneous V.34 communication channels with a single chip set.

Briefly the above and further objects of the present invention are realized by providing a single chip V.34 communications device responsive to control program commands that implement at least four V.34 communication channels simultaneously. The single chip V.34 communication controller implements both analog and digital standards simultaneously by using a pair of superscalar processors coupled to a multi-functional communication interface unit and a supportive memory system via a common communication bus.

BRIEF DESCRIPTION OF THE DRAWINGS

The above-mentioned and other objects and features of this invention and the manner of attaining them will become apparent, and the invention itself will be best understood by reference to the following description of an embodiment of the invention taken in conjunction with the accompanying drawings, wherein:

FIG. 1 is a block diagram of a multiple channel Internet provider system, which is constructed in accordance with the present invention;

FIG. 2 is a block diagram of a multi-channel V.34 communication device forming part of the Internet provider system of FIG. 1;

FIG. 3 is a partial block diagram of a multi-channel interface forming part of the multi-channel V.34 communication device of FIG. 2;

FIG. 4 is a diagrammatic flow chart of the fetch and execute steps performed by a processor forming part of the communication device of FIG. 2; and FIG. 5 is a high level flow chart diagram for simultaneous communication protocol execution as performed by the Internet provider system of FIG. 1.

DETAILED DESCRIPTION OF THE PREFERRED EMBODIMENT(S)

Referring now to the drawings, and more particularly to FIGS. 1 and 2 thereof, there is shown a single chip multi-channel Internet provider system 10 which is constructed in accordance with the present invention. The Internet provider system 10 provides a plurality of different kinds of communication channels simultaneously in accordance with the novel utilization method of the present invention. More particularly, the Internet provider system 10 provides a multiplicity of both analog and digital communication channels on a single integrated circuit chip substrate, such as the substrate 35 (FIG. 2).

The Internet provider system 10 generally comprises a programmable computer system 20 and at least one multi-port V.34 communication device 21 having a plurality of communication ports 70. For simplifying the disclosure herein, the system 10 is shown with a single multi-port V.34 communication device 21. Those skilled in the art will understand however that a plurality of such devices are contemplated within the true scope and spirit of the present invention relative to point of present providers.

The Internet provider system 10 further includes a V.34 Modem Program 60 (FIG. 2) having computer readable program code stored thereon that programs the computer system 20 and multi-port communication device 21 to enable them to provide multiple communications over the plurality of communication channels 70 simultaneously. In this regard, the V.34 Modem Program 60 causes the programmable computer system 20 to generate and store a series of signals indicative of procedural steps to perform simultaneous analog and digital communications over a multiple number of communication ports 31–34. The computer system 20, in turn, causes the V.34 Modem Program 60 to be downloaded to the V.34 communication device 21. The Program 60 is a licensed product produced by Motorola® and will not be described hereinafter in greater detail.

Considering now the multi-port V.34 communication device 21 in greater detail with reference to FIGS. 2 and 3, the V.34 communication device 21 is formed on a single substrate 35 and generally comprises a control unit 42 having a first multi-channel controller 42a and a second multi-channel controller 42b. The controllers 42a and 42b interface to a pair of V.34 interface arrangements 50 and 52 via a system bus 40. In order to effect proper simultaneous communications, the V.34 communication device 21 further includes an off-chip SDRAM unit 43 and a boot ROM unit 44.

In the preferred embodiment of the present invention, the SDRAM unit 43 and the boot ROM 44 are not formed on the substrate 35. However, it is contemplated within the scope and spirit of the present invention that the SDRAM unit 43 and the boot ROM 44 would be included on the substrate 35.

Considering now the V.34 interface arrangements 50 and 52 in greater detail with reference to FIGS. 2 and 3, the interface arrangements 50 and 52 include a pair of UART 76 and 106 respectively and a pair of CODEX 72 and 102 respectively, which are coupled to the controllers 42a and 42b via the system bus 40 to enable the execution of the V.34 Modem Program 60 to support multiple V.34 channels.

Considering now the multi-channel controller 42 in greater detail with reference to FIG. 2, the controller 42 generally includes a pair of sub-micro RISC superscalar processor cores 83 and 84, coupled to SDRAM memory system 43 via the system bus 40 for controlling the transmitting and receiving of data over at least four different communication channels simultaneously. The processor cores 83 and 84 are superscalar processor cores manufactured by LSI Logic Corporation of Milpitas, Calif., and are responsible for executing the computer readable codes indicative of the program 60 stored in the SDRAM memory system 43. Such communication utilizes V.34 modem communication protocol and may be effected simultaneously.

The processor cores 83 and 84 are substantially identical, each controlling or supporting a pair of V.34 ports. In this regard, the processor core 83 supports and controls the ports 31–32, while the processor core 84 supports and controls the ports 33–34. As each of the processor cores 83 and 84 are substantially identical, only the processor core 83 will be described hereinafter in greater detail.

Considering now the processor core 83 in greater detail with reference to FIGS. 2–4, the processor core 83 controls all network management, routing and local area network to Internet communication functions and is more fully disclosed in a technical publication published by LSI Logic Corporation entitled "MiniRISC CW4010 Superscalar Microprocessor Core Technical Manual June 1966," identified as Document DB1-000027-00. As this publication provides an adequate description of the core 83, the core 83 will not be described hereinafter in greater detail except as required for clarity in understanding the present inventive communication device 21.

The processor core 83 generally includes an arithmetic logic unit 202 and a multiplier 204 for executing the arithmetic instructions or commands of the processor 83. The multiplier 204 is a two cycle multiply and accumulate previous product hardware arrangement that is required to execute the V.34 communication data pump software forming part of the program 60. In order to permit the arithmetic logic unit 202 to perform the multiply operations, the arithmetic logic unit 202 is coupled to the multiplier 204 by an arithmetic path 223.

The processor core 83 further includes a system control coprocessor 206, a load store unit 214, and an instruction scheduler unit 218 for facilitating improved processor performance as will be described hereinafter in greater-detail.

The processor core 83 is clocked by a single phase, 100 Mhz clock generated by an on chip clock generator 86. The clock generator 86 generates a 33 MHz clock signal that is multiplied internally to support the SDRAM unit 43 with a 66 MHz clock signal and the CW4011 processor 83 with the 100 MHz clock. Power management is provided by a "wait for interrupt" instruction and by gating clock signals separately to each of the above-mentioned functional units 202, 204, 206, 214, and 218 respectively. The functional units are clocked only when needed. In addition, the processor core 83 is completely static, so that the clock may be slowed or turned off in order to conserve power.

In order to help improve the performance of the processor 83, the controller 42a includes a pair of cache memory units, such as an instruction cache memory unit 87 and a data cache memory unit 88. The instruction cache memory unit 87 is a direct-mapped or two-way set associative instruction cache with a selectable cache size of up to sixteen kilobytes.

The instruction cache 87 is coupled to the instruction scheduling unit 218 which controls the instruction cache 87. An instruction communication path 222 couples the instruction cache memory unit 87 to the instruction scheduling unit 218.

The data cache memory unit 88 is a direct-mapped or two-way set associative data cache. The data cache memory unit 88 is coupled to the load store unit 214 which control the data cache 88. A data communication path 226 couples the load store unit 214 to the data cache 88.

The protocol policies of the cache memory units 87 and 88 are similar to the cache polices of a RISC processor and perform the same functions of increasing performance by storing the most recently utilized instructions and data values.

In order to help control the transfer of memory data, the device 21 also includes a Direct memory Access (DMA) controller 94. The memory controller 94 operates under either of the processor cores 83,84 to control the operations of the SDRAM memory unit 43. The main SDRAM memory unit 43 is utilized for storing the V.34 Modem Program 60 for enabling the processor cores 83 and 84 to control the transmitting and receiving of data in a V.34 standard simultaneously over one or more of the port channels 31–34. In this regard, the program 60 enables the execution of the V.34 standards over any one of the four channel parts 31–34 simultaneously.

The boot read only memory unit 44 stores processor boot code which is utilized by the processor 83 to download the program 60 from the computer system 20. In this regard, once the program 60 is downloaded from the system 20, and stored in the SDRAM memory unit 43, the processor core 83 causes application instructions and application data to be stored in respective ones of the instruction cache 87 and the data cache 88 during execution. The processor core cache control policies determine where and what instructions and data values are stored in respective ones of the cache memory units 87 and 88. Such control policies are more fully described in the above-mentioned technical manual published by LSI Logic and will not be described in greater detail.

Considering the processor core 83 in still greater detail with reference to FIGS. 2 and 3, the processor core 83 also includes four on-chip communication channels:

1) A coprocessor interface 207 for interconnecting the processor core 83 with a plurality of other coprocessors (not shown) as well as the internal coprocessor 206 forming part of the communication controller 42.

2) A cache invalidation interface 208 for coupling the processor core 83 with a cache coherency logic arrangement (not shown). The processor core 83 utilizes the cache invalidation interface to communicate only with the on-chip caches, such as the instruction cache 87 and the data cache 88.

3) A bi-directional system bus 40 permits the processor core 83 to communicate with other controller elements that will be described hereinafter in greater detail. The system bus 40 has a 64-bit data bus and a 32-bit address bus. Address and data are not multiplexed. The bus interface unit 211 controls the data transfers on the system bus 40.

4) An on-chip access bus 210 that permits access to on-chip modules (not shown) at a cache read stage, that will be described hereinafter in greater detail, without going through the system bus 40.

The interface 50 is coupled to the first processor 83 and the SDRAM memory controller 90 via the system bus 40, while the second interface module 60 is coupled to the second processor 84 and the SDRAM memory controller 90 via the system bus 40. The first processor 83 controls communications via the two ports 31–32 associated with the first interface 50, while the second processor 84 controls communication via the two ports 33–34 associated with the second interface 60.

Considering now the CODEX unit 72 in greater detail with reference to FIG. 3, the CODEX unit 72 generally includes a CODEC 138 that provides an interface to conventional telephones lines (not shown). The CODEC 138 is coupled to a bus buffer 132 via another communication path 133. The bus buffer provides an interface to the system bus 40.

Considering now the UART 76 in greater detail with reference to FIG. 3, the UART device 76 includes a UART module 128 connected via a path 123 to another bus buffer 122 that provides another interface to the system bus 40.

As the CODEX 72 and 74 are substantially identical and the UART 76 and 78 are substantially identical, CODEX 74 and UART 78 will not be described in further detail.

Considering now the operation of the device 21 in still greater detail with reference to FIGS. 1, 2, and 5 the controller firmware 500 begins at a start operation 501 and advances to a retrieve step 509 which causes boot code to be retrieved from the boot read only memory unit 44. The boot code is utilized by the core processor 83 to download the program 60 from the host system 20.

The device 21 then causes the program 60 to be stored in the SDRAM memory unit 43 at a store step 519.

Next at a query step 529, the controller 42 determines whether the program 60 has been downloaded completely into the SDRAM memory unit 43 from the host system 20. If the program 60 has not been downloaded completely, the store step at 509 is repeated and the controller 42 continues its operation as described previously.

If the program 60 has been downloaded completely into the SDRAM memory unit 43, the controller 42 advances to a query step 548 to determine whether an application interrupt has occurred. If no interrupt has been received by the controller 42, the controller 42 causes a power conservation step 549 to be performed. In this regard, the controller 42 causes the "wait for interrupt" instruction to be executed. After the wait for interrupt instruction has been executed, the controller 42 returns to the query step 548 and waits for the application interrupt.

When the application interrupt occurs at the query step 548, the controller 42 proceeds to a start application program step 559 which causes the processor core 83 (and processor core 84) to process the program 60. In this regard, the processor core 83 or cores 83,84 enter a six-stage pipeline consisting of a fetch portion 579 (FIGS. 4 and 5) and an execute portion 589 (FIGS. 4 and 5) for each instruction in the program 60. The pipeline operations will be described hereinafter in greater detail with reference to FIG. 3.

At the end of each instruction execution, the processor 83 determines whether the application is done at a query step 599. If the program 60 has not completed its operation, the processor 83 repeats the fetch and execute steps 579 and 589 respectively.

If the processor 83 determines that the program 60 is completed at the query step 599, the processor 83 returns to the wait for interrupt at the query step 548 and proceeds as described previously.

Considering now the processor core 83 pipeline architecture in greater detail with reference to FIG. 4, the processor core 83 has two identical concurrent six-stage pipelines that provide the processor core 83 with its superscalar capabilities. One pipeline is known as the even pipeline or even slot, and the other as the odd pipeline, or odd slot. As the two pipelines are identical only the even pipeline will be described in greater detail Considering now the even pipeline in greater detail with reference to FIG. 4, the even pipeline is divided into an instruction fetch portion, such as the instruction fetch portion 579, and an instruction execution portion, such as the execute portion 589. The instruction fetch portion 579, includes the first three stages of the six-stage operation and the instruction execution portion 589 includes the last three stages of the six-stage operation. In operation, once a given stage has accepted an instruction from a previous state, the current stage must hold the instruction for re-execution in the event the pipeline should stall for any reason.

Considering now the instruction fetch portion 579 of the pipeline in greater detail wit reference to FIG. 4, the instruction fetch portion 579 includes three of the six stages in the pipeline. The function of each pipeline stage in the instruction fetch portion 579 is summarized as follows:

1. A first stage is known as an instruction fetch (IF) stage 603. In the IF stage 603 the processor core 83 fetches an instruction to be executed from the SDRAM memory unit 43.
2. A second stage is a conditional or queuing (Q) stage 605. Instructions may enter this conditional stage 605 if they deal with branches or register conflicts. An instruction that does not cause a branch or register conflict will by-pass this stage and will proceed directly to a third stage that will be described hereinafter in greater detail.
3. A third stage is known as the read (RD) stage 609. During the RD stage 609, any required operandi are read from the register file while the instruction is decoded.

The instruction execution portion 589 of the pipeline is entered directly from the instruction fetch portion 579. The function of each pipeline stage in the instruction execution portion 589 is summarized as follows:

4. A fourth stage, is called an execute (EX) stage 612 where all fetched instructions are executed. Conditional branches are resolved at this stage. In addition, the address calculation for load and store instructions is also performed.
5. A fifth stage is known as a cache read (CR) stage 616 where the instruction cache 87 is read for load and store instructions. At the end of the CR stage, data is returned to the register bypass logic.
6. A last or sixth stage is called a write back (WR) stage 618 where results are written into the register file.

In summary, the communication device 21 is a Coreware® design targeted for GIO®-P technology utilizing dual CW4011 processors 83,84 with a 16-bit MAC solution. Peripheral devices are integrated on the substrate 35 with the processors 83,84 and common system bus 40 and includes four 16550 UART cores, four CODEC cores, and a 66 MHz—64 bit SDRAM controller unit 90.

The performance capabilities of the processors 83 and 84 with the 66 MHz/64 bit SDRAM memory system enables the communication device 21 to be flexible and easily upgraded to accommodate new features or newer high speed providers. In short, the communication device 21 supports two V.34 ports via a single 32-bit RISC micro-processor, such as ports 31–32 controlled by microprocessor 83.

Considering now the programmable computer system 20 in greater detail with reference to FIG. 1, the system 20 generally includes a processor 22 having a data storage system or memory unit 23, which including both volatile and non-volatile memory or storage devices, for executing the computer readable code stored on the CD ROM 62.

A display unit 24 coupled to a processor 22 via an input/output channel controller 25 permits certain ones of the series of communication signals stored in the data storage system 23 to be displayed in a given sequence of frames of video information for helping a user to communicate with other systems (not shown).

To further facilitate the interaction of the user with the tool 60, the programmable computer system 20 further includes a set of conventional input/output devices, such as a keyboard 26, a computer mouse 27, a disk drive unit 28, and a printer 29.

To facilitate causing the processor 22 to transfer the V.34 Modem Program 60 stored on the CD ROM 62 to the communication device 21 and the internal memory storage system 23, the computer system 20 also includes a CD-ROM drive 30 that is adapted to receive the V.34 Modem Program 60.

The V.34 Modem Program 60 is stored on a computer usable medium, such as a CD-ROM disk 62. Thus, when the processor 22 causes the CD-ROM disk drive 30 to read the computer readable code indicative of the V.34 Modem Program 60 embodied on the computer usable medium 62, the V.34 Modem Program 60 is applied to internal storage system 23 of the processor 22 and the communication device 21 to permit the desired communications over the multiple ports 31–34.

Although the preferred form of the present invention has been described as a combination of hardware and software where the storage system 23 and storage medium 62 are so configured to cooperate and cause the system 10 to operate in a specific and predefined manner to perform the directions described herein, those skilled in the art will understand those functions described to create the desired communication procedures may be implemented in hardware or software alone. Also, although the preferred form of the present invention has been described with the tool 60 including a CD-ROM disk 62, the tool may be implemented on other types and kinds of computer media, such as a floppy disk.

Although the present invention has been described in detail with regarding the exemplary embodiments and drawings thereof, it should be apparent to those skilled in the art that various adaptations and modifications of the present invention may be accomplished without departing from the spirit and the scope of the invention.

For example, the preferred embodiment of the present invention is described as being implemented with a CW4011 core microprocessor. However, it is contemplated the system 10 can be implemented with any microprocessor core than can supply the performance required to implement the minimum of two V.34 ports. Accordingly, the invention is not limited to the precise embodiment shown in the drawings and described in detail hereinabove.

I claim:

1. A single chip multi-port communication device, comprising:

an integrated circuit substrate;

a multi-channel interface unit formed on said substrate for providing a plurality of simultaneous communication channels to effect bi-directional transmission of data, wherein said multi-channel interface unit includes a pair of simultaneous analog communications channels and a pair of simultaneous digital communication channels, wherein one of a pair of microprocessors controls one of the analog channels and one of the digital channels, and wherein the other one of the pair of microprocessors controls the other one of the analog channels and the other one of the digital channels;

the pair of microprocessors formed on said substrate for processing the bi-directional transmission of data simultaneously via said plurality of communication channels; and a bus formed on said substrate for coupling together, for signal processing purposes, said multi-channel interface unit and said pair of microprocessors.

2. A single chip multi-port communication device according to claim 1, wherein at least one of said plurality of simultaneous analog channels includes a UART device.

3. A single chip multi-port communication device according to claim 1, wherein said plurality of simultaneous analog channels includes a pair of UART devices.

4. A single chip multi-port communication device according to claim 1, wherein at least one of said plurality of simultaneous digital channels includes a CODEC device.

5. A single chip multi-port communication device according to claim 1, wherein said plurality of simultaneous digital channels includes a pair of CODEC devices.

6. A single chip multi-port communication device according to claim 1, wherein said pair of microprocessors each include a data buffer and an instruction buffer for facilitation and simultaneous bi-directional transmission of data via said plurality of communication channels.

7. A single chip multi-port communication device according to claim 1, wherein said pair of microprocessors operated at one clock rate and wherein said memory controller means operates at another clock rate; and said one clock rate being substantially faster than said another clock rate.

8. A single chip multi-port communication device according to claim 7, further comprising:

means for coupling said integrated circuit substrate to a fixed clock rate signal; and clock generator means formed on said substrate and responsive to said fixed clock rate signal for generating said one clock rate and said another clock rate.

9. A single chip multi-port communication device according to claim 1, wherein said pair of microprocessors are each 32-bit RISC central processing units.

10. A single chip multi-port communication device, comprising:

an integrated circuit substrate;

a multi-channel interface unit formed on said substrate for providing a plurality of simultaneous communication channels to effect bi-directional transmission of data;

a pair of microprocessors formed on said substrate for processing the bi-directional transmission of data simultaneously via said plurality of communication channels;

a bus formed on said substrate for coupling together, for signal processing purposes, said multi-channel interface unit and said pair of microprocessors; and multiply and accumulate core means formed on said substrate and coupled to said pair of microprocessors for optimizing the number of operational steps to effect simultaneous bi-directional data communications via said multi-channel interface unit.

11. An internet provider system, comprising:

a central processing system for processing data received from a plurality of remote locations;

each remote location including at least one communication channel for effecting bi-directional transmission of data between the remote location and said central processing unit;

said central processing system having: a local communication integrated circuit including a central processor unit; a random access memory unit; and a data interface unit for effecting bi-directional transmission of data between a local system user, said central processor unit, and said random access memory unit; and interface means for coupling said bus to said random access memory unit for storing programmatic instructions to effect simultaneous bi-directional transmission of data from said plurality of remote locations to said central processor unit, wherein said multi-channel interface unit includes a pair of simultaneous analog communications channels and a pair of simultaneous digital communication channels, wherein one of a pair of microprocessors controls one of the analog channels and one of the digital channels, and wherein the other one of the pair of microprocessors controls the other one of the analog channels and the other one of the digital channels.

12. A communication controller for transmitting and receiving data on at least three communication channels simultaneously, comprising:

a multi-channel interface unit for coupling the communication controller to the at least three communication channels;

memory means for storing computer readable codes indicative of control commands for transmitting and receiving data substantially simultaneously over at least three different communication channels;

a pair of processor means responsive to the computer readable codes and coupled individually to at least two of said least three communication channels;

a single bi-directional interface bus for coupling said multi-channel interface unit and said memory means to said pair of processor means for bi-directional data transfers simultaneously over said at least three communications channels; and multiply and accumulate core means coupled to said pair of processor means for optimizing the number of operational steps to effect simultaneous bi-directional data communications via said interface bus.

13. A communications controller according to claim 12, wherein each of said pair of processor means is a reduced instruction set computer processor.

14. A communications controller according to claim 12, wherein each of said pair of processor means is a superscalar processor.

15. A communications controller according to claim 12, further comprising a peripheral component interconnect bus interface.

16. A multi-channel communication controller according to claim 12, wherein said memory means includes:

a main memory unit; and a boot memory for storing computer readable boot code.

17. A multi-channel communication controller according to claim 16, wherein said main memory unit is a SDRAM memory unit.

18. A multi-channel communication controller according to claim 16, wherein said boot memory is a read only memory.

19. A multi-channel communication controller according to claim 12, further comprising a single integrated substrate to accommodate the communication controller in a single expansion slot of a personal computer.

20. A single chip multi-port communication device, comprising:

an integrated circuit substrate;

a multi-channel interface unit formed on said substrate for providing a plurality of simultaneous communication channels to effect bi-directional transmission of data, wherein said multi-channel interface unit includes a pair of simultaneous analog communications channels and a pair of simultaneous digital communication channels;

a pair of microprocessors formed on said substrate for processing the bi-directional transmission of data simultaneously via said plurality of communication channels;

wherein one of the pair of microprocessors controls one of the analog channels and one of the digital channels, and wherein the other one of the pair of microprocessors controls the other one of the analog channels and the other one of the digital channels;

a bus formed on said substrate for coupling together, for signal processing purposes, said multi-channel interface unit and said pair of microprocessors;

means for coupling said bus to an external random access memory unit for storing programmatic instructions to effect simultaneous bi-directional transmission of data; and memory controller means responsive to said pair of microprocessors for retrieving the programmatic instruction from said external random access memory unit to instruct the microprocessor on the procedures for moving data between said external random access memory unit and said multi-channel interface unit.

* * * * *